Oct. 28, 1958

H. C. DIENER, JR 2,858,528

INDICATING SYSTEM

Filed April 24, 1957

WITNESSES:
Bernard R. Gieguay
Myron E. Click

INVENTOR
Henry C. Diener, Jr.

BY
F. E. Browder
ATTORNEY

Oct. 28, 1958     H. C. DIENER, JR     2,858,528
INDICATING SYSTEM

Filed April 24, 1957     2 Sheets-Sheet 2

United States Patent Office 2,858,528
Patented Oct. 28, 1958

2,858,528

INDICATING SYSTEM

Henry C. Diener, Jr., Depew, N. Y., assignor to Westinghouse Electric Corporation, East Pittsburgh, Pa., a corporation of Pennsylvania Application April 24, 1957, Serial No. 654,901

7 Claims. (Cl. 340—213)

This invention relates to indicating systems in general and in particular to alarm and annunciator systems utilizing logic element components.

It is an object of this invention to provide an improved indicating system utlizing logic element components.

Another object of this invention is to provide an alarm and annunciator system which utilizes static logic element components.

A further object of this invention is to provide an alarm and annunciator system with either audible or visual indicating means, or both.

Further objects of this invention will become apparent from the following description when taken in conjunction with the accompanying drawings. In said drawings, for illustrative purposes only, are shown preferred forms of the invention.

Figure 1:
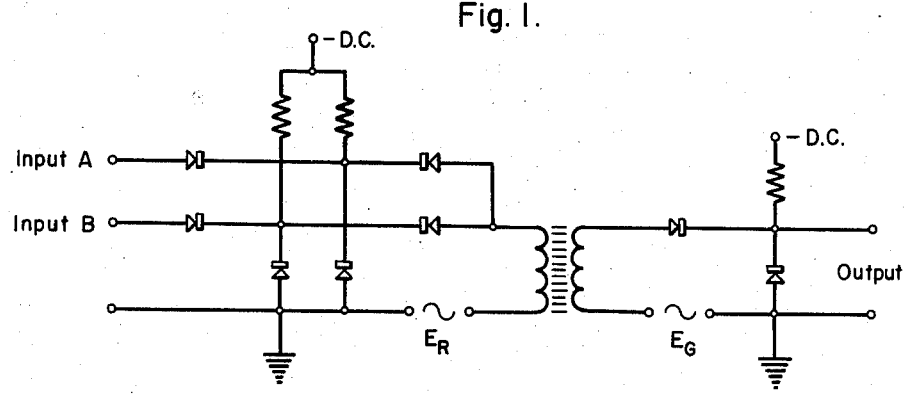
Fig. 1 is a schematic diagram of an And logic element component which may preferably be employed in this invention.

Referring to Fig. 1, there is illustrated a schematic diagram of an And logic element wherein a single core magnetic amplifier is used to perform the And logic function. The And logic function has been defined as functionally equivalent to a plurality of relays in series. That is, no output will result until the plurality of relays are closed simultaneously.

In the schematic diagram of Fig. 1, only two inputs, A and B, are shown, but there may be provided any number of inputs as desired. The schematic of Fig. 1 fulfills the definition of the And logic function in that there will be no output until both of the inputs A and B, or all of a plurality of inputs are present. If one of the inputs is not present, reset of the magnetic core can be accomplished through the non-linear element not blocked.

Figure 2:
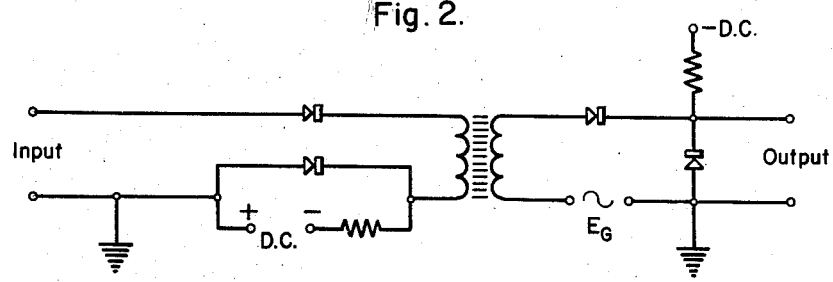
Fig. 2 is a schematic diagram of a Not logic element component which may preferably be employed in this invention.

Referring to Fig. 2, there is illustrated a schematic diagram of a Not logic element wherein a single core magnetic amplifier is used to perform the Not logic function. The Not logic function has been defined as functionally equivalent to the action of a normally closed contact of a relay. That is, there will be an output at all times until the relay is opened.

The schematic diagram of Fig. 2, as shown, is similar to the apparatus illustrated in Fig. 1, except that in Fig. 2 no reset voltage is provided for the magnetic core. The schematic of Fig. 2 fulfills the definition of the Not logic function in that there is an output always present except when an input is provided. If an input is present, it accomplishes reset of the magnetic core on a reset half-cycle, and the output is zero as long as the input is present.

Figure 3:
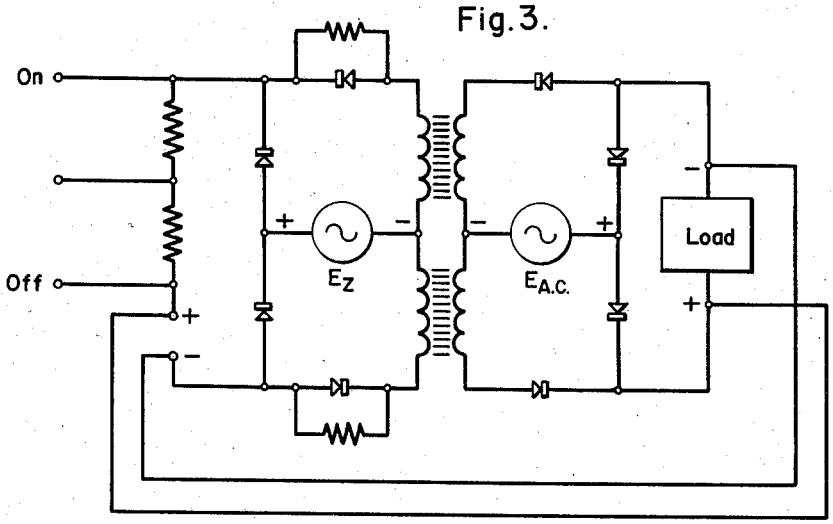
Fig. 3 is a schematic diagram of a Memory logic element component which may preferably be employed in this invention.

Referring to Fig. 3, there is illustrated a schematic diagram of a Memory logic element wherein two single core magnetic amplifiers are used to perform the Memory logic function. The Memory logic function has been defined as essentially an information storage circuit. That is, there is no output until an On input is received whereupon there is an output, even though the On input is removed, until an Off input is received. Upon receipt of the Off input there is no longer an output, even though the Off input is removed, until an On input is received. The schematic of Fig. 3 fulfills the definition of the Memory logic element.

For a more detailed explanation of the description and operation of the apparatus illustrated in Figs. 1, 2 and 3, reference is made to "The Single-Core Magnetic Amplifier as a Computer Element," R. A. Ramey, A. I. E. E. Transactions, vol. 71, part I, pages 442–446.

It is to be understood that the above referenced logic element circuits utilizing magnetic amplifiers to perform the And, Not and Memory logic functions are representative of various circuit configurations known in the art for performing said logic functions. Other configurations, including semiconductors, electronic tubes, relays, etc., will perform the same logic functions and operate the alarm and annunciator system satisfactorily. The magnetic amplifier logic elements are cited herein because of their obvious value in such a system in terms of static reliability and durability, particularly important in said systems.

Figure 4:
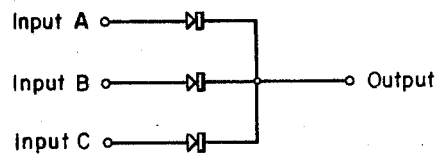
Fig. 4 is a schematic diagram of an Or circuit which may preferably be employed in this invention.

Referring to Fig. 4, there is illustrated a schematic diagram of an Or logic element. The Or logic function has been defined as functionally equivalent to a plurality of relays in parallel. That is, an output will result upon closure of any one relay or any combination of relays.

In the schematic diagram of Fig. 4, only three inputs, A, B, and C, are shown, but there may be a plurality of inputs. The schematic of Fig. 4, which is well known in the art fulfills the definition of the Or logic function in that there will be an output if any one or any combination of a plurality of inputs is present.

Figure 5:
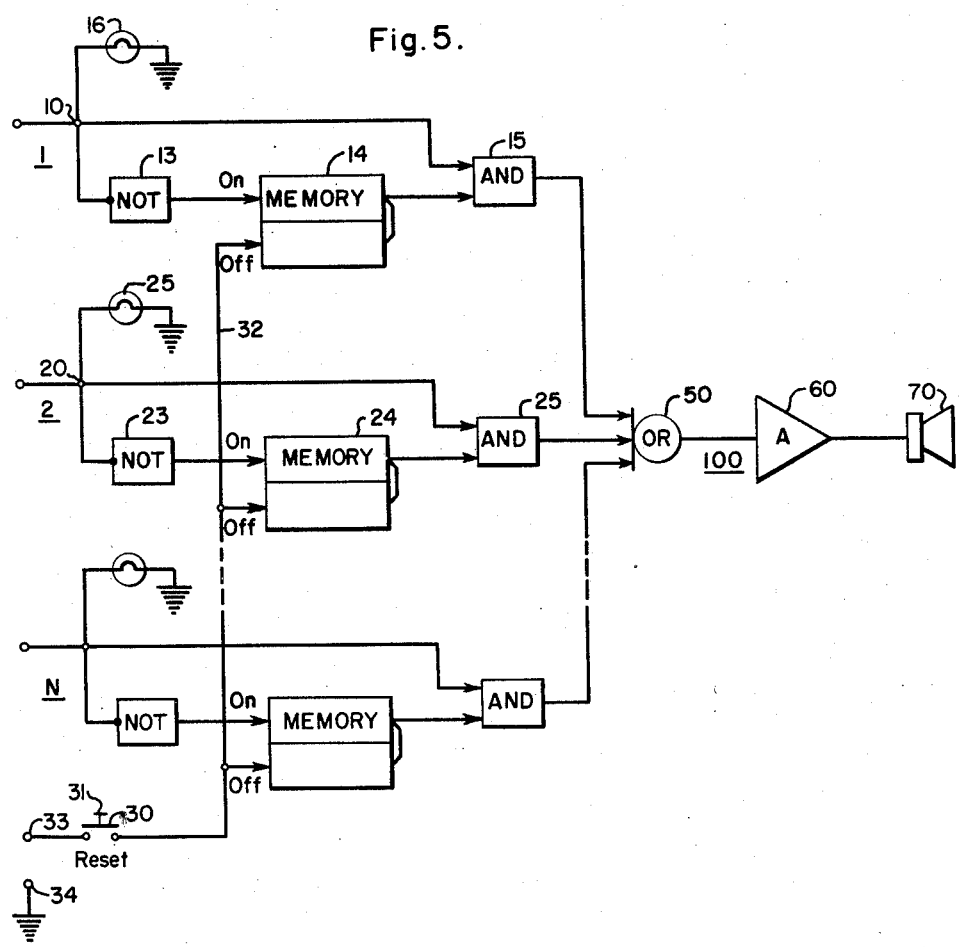
Fig. 5 is a block diagram of an alarm and annuciator system embodying the teachings of this invention.

Referring to Fig. 5, there is illustrated a block diagram of an alarm and annunciator system, utilizing logic element components, embodying the teachings of this invention. The common symbols for the appropriate logic elements as herein described are used but for further clarity they have been denoted individually by legend. In general, this system comprises a plurality of substantially identical monitoring units 1, 2, . . . N, a reset means 30, and an output circuit 100 including an Or circuit 50, a power amplifier 60 and an audible indicator 70.

The monitoring unit 1 comprises an input terminal 10, a visual indicator 16, a Not logic element 13, a Memory logic element 14 and an And logic element 15. The input terminal 10 is connected to the visual indicator 16, to the input terminal of the Not logic element 13 and to the first of two input terminals of the And logic element 15. The output of the Not logic element 13 is connected to the On input terminal of the Memory logic element 14. The Off input terminal of Memory logic element 14 is connected to a conductor 32 of the reset circuit 30. The output of the Memory logic element 14 is connected to a second input terminal of the And logic element 15. The output of the logic element 15 is connected to an input terminal of the Or circuit 50.

The operation of the monitor unit 1 may be divided into two portions, namely, the presence or absence of an input signal at the input terminal 10. When there is no signal present at the input terminal 10, the operation of monitor unit 1 is as follows:

With no signal at the input terminal 10 there is no signal to drive the visual indicator 16 so there is no visual indication for the monitoring unit 1. The Not logic element 13, in view of the definition above, in the absence of an input signal is delivering an output to the On input terminal of the Memory logic element 14. Thus, the Memory logic element 14 is delivering an output to the second input terminal of the And logic element 15. Since there is no signal to the input terminal 10, however, there is no signal to the first input terminal of the And logic element 15. Therefore, there is no output from the And logic element 15 to the output circuit 100.

Now assume a signal is present at the input terminal 10. This signal will drive the visual indicator 16 giving a visual indication as to which of the plurality of monitoring units has received a signal. The signal will also be presented to the input terminal of the Not logic element 13. As per the definition above, the Not logic element 13 will cease delivering an output to the On input terminal of the Memory element 14. However, the Memory element 14, because it last received an On input signal, will still continue to deliver an output to the second input terminal of the And logic element 15. Since the signal presented to the input terminal 10 is also presented to the first input terminal of the And logic element 15, all the requirements are fulfilled for allowing the And logic element 15 to deliver an output to the output circuit 100.

The output circuit 100 comprises an Or circuit 50, a power amplifier 60, and an audible indicator 70. The Or circuit 50 has N number of inputs for N number of monitoring units. The output of the Or circuit 50 is connected to an input of a power amplifier 60. The output of the power amplifier 60 is connected to the input of the audible indicator 70.

In operation, when an input to the output circuit 100 is received from any one or any combination of the N number of monitoring units, an output is delivered to the power amplifier 60 by the Or circuit 50. The power amplifier 60, which may or may not be needed depending upon the magnitude of the outputs delivered by the monitoring units, amplifies the Or circuit 50 output to a magnitude sufficient to drive the audible indicator 70.

After an alarm has been sounded by the audible indicator 70, an operator may reset the audible portion of the system by use of the reset means 30. The reset means 30 for the system, as shown in Fig. 5, comprises a suitable signal source connected to a pair of terminals 33 and 34, a suitable switching device such as a push-button switch 31, and a conductor 32 connected to the Off input terminals of each of the N number of Memory logic elements in each monitor unit.

By pressing the pushbutton switch 31, a signal is sent to the Off input terminal of all the Memory logic elements. If the individual monitor unit does not have an input signal present at its input terminal, the reset signal will not affect its standby status. That is, as described above, the Not logic element of each monitor unit will be producing an output to the On input terminal of the associated Memory logic element. So after the reset signal to the Off input terminal is removed, the Not logic element will turn the Memory logic element back on.

If the individual monitor unit is delivering an output to the output circuit 100, the reset signal will operate to turn the Memory logic element off. Since, as described above, the Not logic element is not delivering an output to the On input terminal of its associated Memory logic element, then said Memory logic element will stay turned off even after the reset signal to the Off input terminal is removed. Therefore, one of the essential inputs to the And logic elements of that particular individual monitor unit will not receive an output from the associated Memory logic element, and there will no longer be an output to the output circuit 100.

Thus, upon pressing the pushbutton switch 31, the operator stops the audible indication, but still has a visual indication as to which monitor unit is receiving a signal. The visual indicator remains on until the condition causing the input signal to the individual monitor unit is cleared.

Any desired number of the substantially identical monitor units 1, 2, . . . N, may be included in the alarm and annunciator system and be connected to the output circuit 100. The power amplifier 60 may be any one of a number now available on the market. The audible indicator 70 may be a buzzer, horn or any other suitable audible means. The visual indicator for each monitor unit may be an incandescent lamp, a glow tube or any other suitable visual indicating means.

In conclusion, it is pointed out that while the illustrated example constitutes a practical embodiment of my invention, I do not limit myself to the exact details shown, since modification of the same may be varied without departing from the spirit of this invention.

I claim as my invention:

1. In an indicating system, a plurality of monitor units, each of said monitor units having an input means, Not logic element means adapted to receive a signal from said input means of said monitor unit, Memory logic element means adapted to receive the output of said Not logic element means at an On input of said Memory logic element means, And logic element means having a first and a second input, the first input of said And logic element means being adapted to receive a signal from said input means of said monitor unit, the second input of said And logic element means being adapted to receive the output of said Memory logic element means, an output means for the said system having indicating means and adapted to receive the outputs of the said plurality of monitor units, and reset means for said system adapted to deliver a signal to an Off input of each Memory logic element means associated with each said monitor unit.

2. In an indicating system, a plurality of monitor units, each of said monitor units having an input means, a Not logic element means adapted to receive a signal from said input means of said monitor unit, a Memory logic element means adapted to receive the output of said Not logic element means at an On input of the said Memory logic element means, And logic element means having a first and a second input, the first input of said And logic element means being adapted to receive a signal from said input means of said monitor unit, the second input of said And logic element means being adapted to receive the output of said Memory logic element means, an output means for the said system having an Or circuit means, amplifier means adapted to receive the outputs of the said plurality of monitor units, audible indicating means responsive to the output from said amplifier means and reset means for said system adapted to deliver a signal to an Off input of each Memory logic element means associated with each said monitor unit.

3. In an alarm and annunciator system, a plurality of monitor units, each of said monitor units having an input means, Not logic element means adapted to receive a signal from said input means of said monitor unit, Memory logic element means adapted to receive the output of said Not logic element means during an On input of the said Memory logic element means, And logic element means having a first and a second input, the first input of said And logic element means being adapted to receive a signal from said input means of said monitor unit, the second input of said And logic element means being adapted to receive the output of said Memory logic element means, an output means for the said system comprising an Or circuit means, amplifier means responsive to the outputs of said Or circuit means audible indicating means responsive to said amplifier means, and reset means for said system adapted to deliver a signal to an Off input of each Memory logic element means associated with each said monitor unit, said reset means comprising switching means and means for connecting a signal source to said Off input of each said Memory logic element means.

4. In an alarm and annunciator system, a plurality of monitor units, each of said monitor units having an input means, a Not logic element means connected to said input means of said monitor unit, said Not logic element means comprising means for producing an output from said Not logic element means at all times except when there is an input to said Not logic element means, the output of said Not logic element means being connected to an On input of a Memory element means, said Memory logic element means comprising means for producing an output in response to a signal at said On input of said Memory logic element means and terminating said output in response to a signal at an Off input of said Memory logic element means, And logic element means having a first and second input, the first input of said And logic element means being connected to said input means of said monitor unit, the second input of said And logic element means being connected to the output of said Memory logic element means, said And logic element means comprising means for producing an output only when signals at both of said first and second inputs are present, an output means for the said system having an indicating means, and a reset means for said system connected to said Off inputs of each of said Memory logic element means associated with each said monitor unit.

5. In an alarm and annunciator system, a plurality of monitor units, each of said monitor units having input means, Not logic element means connected to said input means of said monitor unit, said Not logic element means comprising means for producing an output from said Not logic element means at all times except when there is an input to said NOT logic element means, the output of said Not logic element means being connected to an On input of a Memory element means, said Memory logic element means comprising means for producing an output in response to a signal at said On input of said Memory logic element means and terminating said output in response to a signal at an Off input of said Memory logic element means, And logic element means having a first and second input, the first input of said And logic element means being connected to said input means of said monitor unit, the second input of said And logic element means being connected to the output of said Memory logic element means, said And logic element means comprising means for producing an output only when signals at both of said first and second inputs are present, an output means for the said system comprising an Or circuit means, power amplifier means connected to said Or circuit means and an audible indicating means connected to said amplifier means, and a reset means for said system connected to said Off inputs of each of said Memory logic element means associated with each said monitor unit.

6. In an alarm and annunciator system, a plurality of monitor units, each of said monitor units having an input means, Not logic element means connected to said input means of said monitor unit, said Not logic element means comprising means for producing an output from said Not logic element means at all times except when there is an input to said Not logic element means, the output of said Not logic element means being connected to an On input of a Memory element means, said Memory logic element means comprising means for producing an output in response to a signal at said On input of said Memory logic element means and terminating said output in response to a signal at an Off input of said Memory logic element means, And logic element means having a first and second input, the first input of said And logic element means being connected to said input means of said monitor unit, the second input of said And logic element means being connected to the output of said Memory logic element means, said And logic element means comprising means for producing an output only when signals at both of said first and second inputs are present, an output means for the said system comprising Or circuit means, power amplifier means responsive to said Or circuit means, audible indicating means responsive to said power amplifier means, and reset means for said system connected to said Off inputs of each of said Memory logic element means associated with each said monitor unit, said reset means comprising switching means and means for connecting a signal source to said Off input of each said Memory logic element means.

7. In an alarm and annunciator system, a plurality of monitor units, each of said monitor units having input means, a visual indicating means responsive to said input means, Not logic element means connected to said input means of said monitor unit, said Not logic element means comprising magnetic amplifier means for producing an output from said Not logic element means at all times except when there is an input to said Not logic element means, the output of said Not logic element means being connected to an On input of a Memory element means, said Memory logic element means comprising magnetic amplifier means for producing an output in response to a signal at said On input of said Memory logic element means and terminating said output in response to a signal at an Off input of said Memory logic element means, And logic element means having a first and second input, the first input of said And logic element means being connected to said input means of said monitor unit, the second input of said And logic element means being connected to the output of said Memory logic element means, said And logic element means comprising magnetic amplifier means for producing an output only when signals at both of said first and second inputs are present, output means for the said system having an audible indicating means, and reset means for said system connected to said Off inputs of each of said Memory logic element means associated with each monitor unit.

No references cited.